July 14, 1931.    J. F. SEES    1,814,861

SOUND RECORDING AND REPRODUCING APPARATUS

Filed Jan. 4, 1930

Inventor
Joseph F. Sees,
by *Charles E. Tullar*
His Attorney.

Patented July 14, 1931

1,814,861

UNITED STATES PATENT OFFICE

JOSEPH F. SEES, OF SCHENECTADY, NEW YORK, ASSIGNOR TO GENERAL ELECTRIC COMPANY, A CORPORATION OF NEW YORK

SOUND RECORDING AND REPRODUCING APPARATUS

Application filed January 4, 1930. Serial No. 418,625.

My invention relates to apparatus for photographically recording sound on a moving film and to apparatus for reproducing sound from a moving film having a photographic sound record thereon. More particularly it relates to that part of the apparatus by which a light beam is directed on the moving film in a desired manner. Sound recording and reproducing apparatus heretofore constructed has included a supporting member for the moving film, a member having therein a narrow aperture or slit extending transversely of the film and a lens or lenses for producing a reduced image of the aperture on the film together with suitable means for throwing a bright light on the aperture. The various parts have been firmly secured to a suitable base of massive character, thus eliminating or reducing vibration. Under certain conditions it is desirable that the operator be able to vary slightly the length and position of the line of light on the film constituting the image of the aperture and this preferably without affecting the mounting of the parts upon the base. It is the object of my invention therefore to provide an improved construction of apparatus of the above-mentioned character having means by which such adjustments of the light line on the film may readily be effected.

My invention will be better understood from the following description taken in connection with the accompanying drawings, and its scope will be pointed out in the appended claims.

Figure 1:
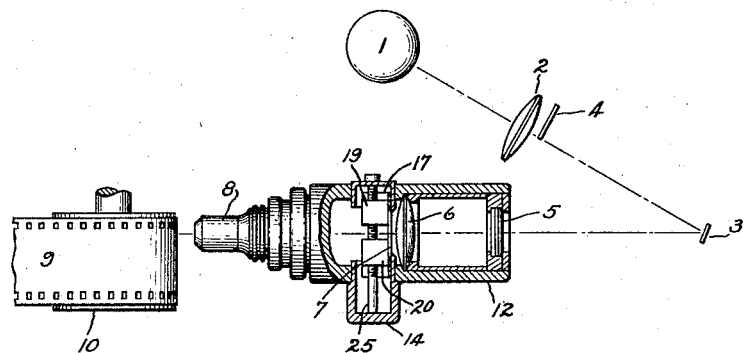
Figure 2:
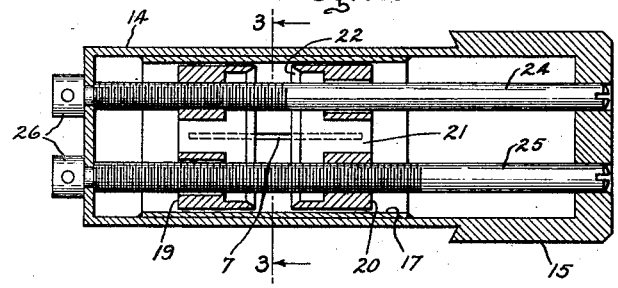
Figure 3:
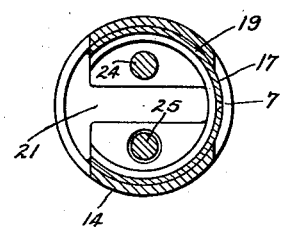

Referring to the drawings, Fig. 1 is a top view with parts in section of a recording apparatus involving my invention; Fig. 2 shows a detail of this apparatus drawn to a larger scale, and Fig. 3 is a transverse sectional view taken on the line 3—3 of Fig. 2.

The general arrangement of the recording apparatus illustrated by Fig. 1 includes the electric lamp 1, the light from which is brought to a focus by the lens 2 on the oscillograph galvanometer mirror 3, a suitable stop 4 being used to give a sharp edge to the line of light on the film. In the path of the light beam reflected by the mirror is the cylindrical lens 5, the spherical lens 6, the narrow aperture 7 and the miscroscope objective 8 by means of which there is focused upon the sensitive film 9 supported on the drum 10 a reduced image of the aperture. Vibratory movement of the mirror 3 in accordance with the sound waves to be recorded causes the light beam to illuminate more or less of the length of the aperture, whereby a variable width type of record is produced on the film in the well known manner. Lenses 5 and 6 and the objective 8 are mounted in the holder or tube 12. The aperture 7 is mounted in the small transverse holder or tube 14 which is detachably mounted in the larger tube 12. Tube 14 shown in Figs. 2 and 3, drawn to a larger scale, is illustrated as having the enlarged end portion 15, which preferably is knurled for use as a handle by which the tube is inserted and withdrawn from the tube 12. Secured within tube 14 is the tube 17, and in this tube there is formed the aforesaid aperture 7. The width of this aperture may be one or two one-thousandths of an inch, the exact width being immaterial to my present invention. Slidingly mounted on the inner surface of tube 17 are the two shutters 19 and 20 which determine respectively the two ends of the aperture opening. Each shutter has the central cut away portion 21 to allow the free passage therethrough of the light passing the aperture and for the same purpose that portion of tube 17 opposite the aperture is also cut away, as shown best by Fig. 3. Those portions of the shutters which cooperate with the aperture are also preferably beveled as shown at 22 in Fig. 2. The two shutters are moved longitudinally of the aperture and independently of each other by the screws 24 and 25, the former being threaded into shutter 19 and the latter being threaded into shutter 20. The screws are rotatably supported in the end portions of tube 14, being slotted at one end for the reception of a screw driver and being provided with retaining enlargements 26 at their other ends.

By the construction which I have described above it will be seen that by simply turning one or both of the screws 24 and 25 in the proper direction the operator may vary the effective length of the aperture 7 and hence the length of the line of light on the film and by appropriately turning both screws he may also adjust the position of the light line transversely of the film. These adjustments are easily effected without disturbing the mounting of any of the elements of the apparatus. My invention is equally adapted for use with sound reproducing apparatus where a fixed light beam is directed on the aperture and after passing through the film the light enters a photo-electric device. My invention moreover is adapted for use in other recording systems using a focused aperture, such for example, as those wherein the width of the aperture is varied in accordance with the sound waves.

I have chosen the particular embodiment described above as illustrative of my invention, and it will be apparent that various modifications may be made without departing from the spirit and scope of my invention, which modifications I aim to cover by the appended claims.

What I claim as new and desire to secure by Letters Patent of the United States is:—

1. Apparatus for producing an adjustable light line on a moving film, comprising a tubular support having a lens mounted at one end thereof adjacent the film and having an intermediate transverse opening therein, a member detachably mounted in said opening having a light aperture therein and having a guide surface extending longitudinally thereof, shutters engaging said guide surface at the respective ends of said aperture, and screws mounted in said member for adjusting the respective shutters.

2. Apparatus for producing an adjustable light line on a moving film comprising a tubular supporting member having a transverse opening therein, a member detachably mounted in said opening having a narrow light aperture therein, a shutter mounted in said detachable member at each end of the aperture, a separate adjusting screw for each shutter, and a lens in said supporting member for imaging the aperture on the film.

In witness whereof, I have hereunto set my hand this 3rd day of January, 1930.

JOSEPH F. SEES.